3,455,661
BIS-(HYDRAZINE)DECABORANE(12) COMPOUNDS

William V. Hough, Gibsonia, and William J. Cooper, Butler, Pa., assignors to Mine Safety Appliances Company, a corporation of Pennsylvania
No Drawing. Filed Aug. 9, 1965, Ser. No. 480,247
Int. Cl. C01b 21/06, 21/16; C07f 5/02
U.S. Cl. 23—358                                         6 Claims

ABSTRACT OF THE DISCLOSURE

Compounds of decaborane with hydrazines and lower alkyl substituted hydrazines are prepared in a reaction solvent consisting of a lower alkyl ether and an alcohol.

---

This invention relates to new compounds of decaborane with hydrazines and lower alkyl substituted hydrazines.

Decaborane reacts with hydrazine and lower alkyl hydrazines to form various compounds depending on the environment of the reaction. When the reactions are performed in hydrocarbon or ether solvents, the products are adducts of the hydrazine compound and decaborane having the general formula $(N_2R_4)_x(B_{10}H_{14})_y$, as is disclosed by Hough and Hashman in application Ser. No. 806,728, filed Apr. 15, 1959. When the reaction is performed in alcohol solvents, the products are tetradecahydrononoborate (-1) compounds, compounds having only nine boron atoms, as disclosed in the patent application of Hough and Hefferan, Ser. No. 312,783 filed Sept. 30, 1963.

It is the object of this invention to provide new bi-substituted hydrazine decaborane compounds. Another object is to provide a method of reacting decaborane with hydrazine or lower alkyl substituted hydrazines to produce bi-substituted hydrazine decaborane compounds. A further object is to provide new high energy fuels and methods for their preparation. Other objects will be apparent from the following description and claims.

The new compounds of this invention have the general formula $$(N_2H_xR_{4-x})_2B_{10}H_{12}$$

where R is hydrogen or a lower alkyl radical and $x$ is an integer from 0 to 4. The compounds are bi-substituted decaboranes, that is two of the decaborane hydrogens are replaced by hydrazine or a lower alkyl substituted hydrazine. According to standard nomenclature practice, the compounds are designated as bis-(hydrazine) decaborane (12); for example $(N_2H_4)_2B_{10}H_{12}$ is named bis-(methylhydrazine)decaborane (12), $(CH_3N_2H_3)_2B_{10}H_{12}$ is named bis-(methylhydrazine)decaborane (12), and $$[(CH_3)_2N_2H_2]_2B_{10}H_{12}$$

is named bis-(dimethylhydrazine)decaborane (12).

In accordance with this invention the reaction of decaborane with hydrazine or lower alkyl substituted hydrazines is directed to yield substantially only the new bis-(hydrazine)decaborane(12) compounds by (a) reacting decaborane and the hydrazine compound in an ether solvent containing a minor amount of alcohol to form an intermediate product, and (b) heating the intermediate product under vacuum. The process can be represented by the equations:

(a)

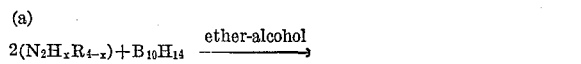
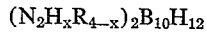

(b)

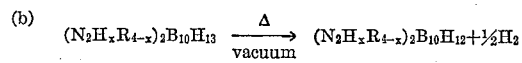
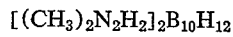

The reaction (a) is directed to form the desired intermediate by contacting the reactants in an ether solvent containing a small amount of an alcohol. Any aliphatic ethers are suitable for use, lower dialkyl ethers, e.g. diethyl ether, are preferred. Any alcohol may be used and lower aliphatic alcohol, such as, for example, methanol, ethanol and propanol, are preferred. Suitable mixed solvents contain from about 0.1 to 10% alcohol by volume, preferably between about 0.5 to 5% alcohol. The reaction is conveniently carried out at room temperature although higher or lower temperatures may be used if desired, suitably between about 0° C. and 40° C. The proportion of reactants is not critical, but it is generally preferred to use stoichiometric amounts or a slight excess of decaborane. The intermediate, which precipitates from the reaction mixture, has a fixed elemental content, or empirical formula; however, its structure has not been established. It may be a constant mixture of two or more decaborane compounds.

The intermediate solid material recovered from the reaction in the mixed ether-alcohol solvent very slowly loses hydrogen at ambient or slightly elevated temperatures to form a bis-(hydrazine)decaborane(12). In order to obtain practical hydrogen evolution rates, it is preferred to heat the intermediate, suitably to between about 50° C. and 150° C., under vacuum. A preferred method is to slurry the intermediate in an inert fluid, such as a hydrocarbon, and heat the slurry under vaccum or nitrogen.

Hydrazine or any lower alkyl substituted hydrazine i.e., having substituted alkyl groups containing no more than 6 carbon atoms, may be used in the method of this invention to prepare the corresponding bis-(hydrazine) decaborane. Suitable hydrazine compounds include hydrazine, monomethyl hydrazine, sym-dimethyl hydrazine, unsym-dimethyl hydrazine, trimethyl hydrazine, tetramethyl hydrazine, monoethyl hydrazine, triethyl hydrazine, mono-n-propyl hydrazine, sym-di-n-propyl hydrazine, and mono-n-butyl hydrazine.

In the following example that is illustrative of this invention, 23.4 mmoles of decaborane and 23.9 mmoles of monomethyl hydrazine were stirred at room temperature for 21 hours in 40 ml. of diethyl ether containing 5 drops of ethanol. Approximately 10 mmoles of hydrogen were evolved and a yellow-white precipitate formed. The solution was filtered and the product was dried in vacuo. Evaporation of ether from the filtrate left a large residue of unreacted decaborane. Analysis of the solid product were B, 47.1 mat./g. (milliatoms per gram); C, 8.7 mat./g.; N, 187 mat./g.; H, 117 mat./g., which corresponds to the theoretical analyses of $$(CH_3N_2H_3)_2B_{10}H_{13}$$

which are B, 46.8 mat./g.; C, 9.3 mat./g.; N, 18.7 mat./g.; H, 117 mat./g. 4.27 mmoles of the product mixture was added to 7 ml. of toluene, in which the product is insoluble, and heated in vacuo to 60° C. until no further hydrogen was evolved. The hydrogen loss was 2.24 mmoles. The product remaining in the toluent was filtered, washed and n-pentane and dried. The product was identified as bis-(monomethylhydrazine)decaborane (12) by elemental analysis, infra-red spectrum analysis and X-ray pattern analysis. The elemental analysis were B, 47.0 mat./g.; C, 10.3 mat./g.; N, 18.7 mat./g.; H, 111 mat./g.; corresponding to theoretical values of B, 47.1 mat./g.; C, 103 mat./g.; N, 18.7 mat./g.; and H, 113 mat./g. The characteristic X-ray powder diffraction bands are 5.8 (very strong), 5.1 (very strong), 4.6 (weak), and 4.1 (very weak).

The bis-(monomethylhydrazine)decaborane(12) is a white crystalline solid. It is insoluble in ethers and hydrocarbons, slightly soluble in alcohols and soluble in water, with no evidence of hydrolysis. It is stable in vacuo to at least 200° C. and has a heat formation of 25° C. of about −80 Kcal./g. Other bis-(hydrazine)decaborane (12) compounds, e.g. bis-(hydrazine)decaborane(12), bis-(sym-dimethylhydrazine)decaborane(12) and bis-(unsym-dimethylhydrazine)decaborane(12) are like bis-(monomethylhydrazine)-decaborane(12) insoluble in ethers and hydrocarbon, slightly soluble in alcohols, soluble in water, with no evidence of hydrolysis, and thermally stable.

The bis-(hydrazine)decaborane(12) compounds of this invention are especially desirable for solid fuels because of their resistance to hydrolysis thermal stability and high heat of combustion. These compounds burn readily with conventional solid chemical oxidizers and are useful as fuel components in solid non-propellants when compounded with conventional oxidizers and binders. The compounds of this invention are also useful as intermediates in the synthesis of other compounds in which a decaborane-type structure is desired.

According to the provisions of the patent statutes, we have explained the principle and mode of practice of our invention and have described what we now consider to represent its best embodiment. However, we desire to have it understood that, within the scope of the appended claims, the invention may be practiced otherwise than as specifically described.

We claim:

1. A method of preparing a bis-(hydrazine)decaborane(12) comprising the steps of:
   (a) contacting and reacting decaborane and a compound selected from the group consisting of hydrazine and lower alkyl substituted hydrazines in a reaction solvent consisting essentially of a lower alkyl ether and an alcohol, whereby a precipitate is formed;
   (b) recovering said precipitate; and
   (c) heating said precipitate, whereby hydrogen is evolved, to form said bis-(hydrazine)decaborane (12).

2. A method according to claim 1 in which the solvent contains from about 0.5 to 5% alcohol.

3. A method according to claim 1 in which the ether is diethyl ether and the alcohol is a lower aliphatic alcohol.

4. A method according to claim 1 in which step (a) is performed at about room tempearture.

5. A method according to claim 1 in which step (c) is performed under vacuum.

6. A method of preparing a bis-(hydrazine)decaborane(12) that comprises the steps of:
   (a) contacting and reacting decaborane and a compound selected from the group consisting of hydrazine and lower alkyl substituted hydrazines at about room temperature in a reaction solvent consisting of diethyl ether containing about 0.5 and 5 ethanol, whereby a precipitate is formed;
   (b) recovering said precipitate; and
   (c) slurrying said precipitate in a hydrocarbon, heating said slurry under vacuum whereby hydrogen is evolved and recovering said bis-(hydrazine)decaborane(12) formed thereby.

References Cited
UNITED STATES PATENTS

| | | | |
|---|---|---|---|
| 3,148,938 | 9/1964 | Knoth | 23—190 X |
| 3,149,010 | 9/1964 | Armstrong | 23—190 X |
| 3,153,567 | 10/1964 | Fetter | 23—358 X |
| 3,269,802 | 8/1966 | Grafstein | 23—358 |
| 3,264,071 | 8/1966 | Hough | 23—358 |
| 3,298,799 | 1/1967 | Hough et al. | 23—358 |

OSCAR R. VERTIG, Primary Examiner

G. O. PETERS, Assistant Examiner

U.S. Cl. X.R.

23—190; 260—606.5